US008918318B2

(12) United States Patent
Onishi (10) Patent No.: US 8,918,318 B2
(45) Date of Patent: Dec. 23, 2014

(54) EXTENDED RECOGNITION DICTIONARY LEARNING DEVICE AND SPEECH RECOGNITION SYSTEM

(75) Inventor: Yoshifumi Onishi, Minato-ku (JP)

(73) Assignee: NEC Corporation, Tokyo (JP)

(*) Notice: Subject to any disclaimer, the term of this patent is extended or adjusted under 35 U.S.C. 154(b) by 1005 days.

(21) Appl. No.: 12/523,302

(22) PCT Filed: Jan. 15, 2008

(86) PCT No.: PCT/JP2008/050346
§ 371 (c)(1),
(2), (4) Date: Jul. 15, 2009

(87) PCT Pub. No.: WO2008/087934
PCT Pub. Date: Jul. 24, 2008

(65) Prior Publication Data
US 2010/0023329 A1    Jan. 28, 2010

(30) Foreign Application Priority Data

Jan. 16, 2007   (JP) .................................. 2007-006977

(51) Int. Cl.
*G10L 15/00*       (2013.01)
*G10L 15/07*       (2013.01)
*G10L 15/06*       (2013.01)

(52) U.S. Cl.
CPC ......... *G10L 15/07* (2013.01); *G10L 2015/0635* (2013.01)
USPC ..... 704/244; 704/9; 704/4; 704/3; 704/270.1; 704/270; 704/257; 704/251; 704/243; 704/235; 704/231; 704/10; 707/740; 434/308; 379/88.14; 379/88.03; 379/265.02; 345/173; 341/106

(58) Field of Classification Search
USPC .......... 704/251, 270.1, 9, 4, 3, 270, 257, 243, 704/235, 231, 10; 707/740; 434/308; 379/88.14, 88.03, 265.02; 345/173; 341/106
See application file for complete search history.

(56) References Cited

U.S. PATENT DOCUMENTS 4,843,389 A * 6/1989 Lisle et al. ................... 341/106
(Continued)

FOREIGN PATENT DOCUMENTS

JP       61-53699 A       3/1986
JP       62-235992 A      10/1987
(Continued)

OTHER PUBLICATIONS

Shoei Sato, et al., "Acoustic models for utterance variation in broadcast commentary and conversation", IEICE Technical Report, Dec. 14, 2005, pp. 31-36, vol. 105, No. 493.
(Continued)

*Primary Examiner* — Michael Colucci
(74) *Attorney, Agent, or Firm* — Sughrue Mion, PLLC (57) ABSTRACT

Speech recognition of even a speaker who uses a speech recognition system is enabled by using an extended recognition dictionary suited to the speaker without requiring any previous learning using an utterance label corresponding to the speech of the speaker. An extended recognition dictionary learning device includes an utterance variation data calculating section for comparing an acoustic model sequence output from a speech recognition result and an input correct acoustic model sequence to calculate a correspondence between the models as utterance variation data; an utterance variation data classifying section for classifying the calculated utterance variation data into widely appearing utterance variations and unevenly appearing utterance variations; and a recognition dictionary extending section for defining a plurality of utterance variation sets by combining the classified utterance variations and thereby extending the recognition dictionary for each utterance variation set according to the utterance variations included in each utterance variation set. A speech recognition device uses the extended recognition dictionary for each utterance variation set to output a speech recognition result.

11 Claims, 7 Drawing Sheets

(56) References Cited

U.S. PATENT DOCUMENTS

| | | | |
|---|---|---|---|
| 5,404,299 A * | 4/1995 | Tsurubayashi et al. | 704/10 |
| 5,875,443 A * | 2/1999 | Nielsen | 1/1 |
| 6,061,646 A * | 5/2000 | Martino et al. | 704/3 |
| 6,272,464 B1 * | 8/2001 | Kiraz et al. | 704/257 |
| 6,345,245 B1 * | 2/2002 | Sugiyama et al. | 704/10 |
| 6,456,975 B1 * | 9/2002 | Chang | 704/270.1 |
| 6,744,860 B1 * | 6/2004 | Schrage | 379/88.03 |
| 6,810,376 B1 * | 10/2004 | Guan et al. | 704/9 |
| 6,876,963 B1 * | 4/2005 | Miyahira et al. | 704/4 |
| 7,031,908 B1 * | 4/2006 | Huang et al. | 704/9 |
| 7,042,443 B2 | 5/2006 | Woodard et al. | 345/173 |
| 7,113,910 B1 * | 9/2006 | Pereira et al. | 704/270 |
| 7,197,460 B1 * | 3/2007 | Gupta et al. | 704/270.1 |
| 7,257,531 B2 | 8/2007 | Holub | 704/235 |
| 7,283,997 B1 * | 10/2007 | Howard et al. | 1/1 |
| 7,392,185 B2 | 6/2008 | Bennett | 704/243 |
| 7,567,953 B2 * | 7/2009 | Kadayam et al. | 1/1 |
| 7,657,424 B2 * | 2/2010 | Bennett | 704/9 |
| 7,840,565 B2 | 11/2010 | Kutsumi et al. | 707/740 |
| 2002/0091528 A1 * | 7/2002 | Daragosh et al. | 704/270.1 |
| 2002/0138265 A1 * | 9/2002 | Stevens et al. | 704/251 |
| 2004/0019482 A1 * | 1/2004 | Holub | 704/231 |
| 2005/0105712 A1 * | 5/2005 | Williams et al. | 379/265.02 |
| 2007/0038625 A1 * | 2/2007 | Yang-Stephens et al. | 707/6 |
| 2007/0048715 A1 * | 3/2007 | Miyamoto et al. | 434/308 |
| 2007/0153989 A1 * | 7/2007 | Howell et al. | 379/88.14 |

FOREIGN PATENT DOCUMENTS

| | | |
|---|---|---|
| JP | 7-20889 A | 1/1995 |
| JP | 8-123470 A | 5/1996 |
| JP | 2701500 A | 1/1998 |
| JP | 10-97293 A | 4/1998 |
| JP | 11-344992 A | 12/1999 |
| WO | 2006/126649 A1 | 11/2006 |

OTHER PUBLICATIONS

Mitsuru Samejima, et al., "Kodomo Onsei ni Taisuru Jubun Tokeiryo ni Motozuku Kyoshi Nashi Washa Tekio no Kento", The Acoustical Society of Japan (ASJ) 2004 Nen Shuki Kenkyu Happyokai Koen Ronbunshu -I-,Sep. 21, 2004, pp. 109-110, Feb. 4, 2012.

Hiroaki Nanjo, et al., "Language Model and Speaking Rate Adaptation for Spontaneous Presentation Speech Recognition", The Transactions of the Institute of Electronics, Information and Communication Engineers D-II, Aug. 1, 2004, pp. 1581-1592, vol. J87-D-II.

Yumi Wakita, et al., "Phoneme Candidate Re-entry Modeling Using Recognition Error Characteristics over Multiple HMM States", Transactions of the Institute of Electronics, Information and Communication Engineers D-II, Dec. 1996, pp. 2086-2095, vol. J79-D-II, No. 12.

Hideki Asoh, et al., "Pattern Recognition and Learning from the perspective of statistical science: Section I—Pattern Recognition and Learning", 2003, pp. 58-61.

Nagao, et al., "Information Processing of Characters and Sounds", Iwanami-Shoten, Jan. 2001, pp. 34-35.

Jonathan G. Fiscus, "A Post-Processing System to Yield Reduced Word Error Rates: Recognizer Output Voting Error Reduction (Rover)", Proc. IEEE ASRU Workshop, 1997, pp. 1-8.

\* cited by examiner

FIG.3

UTTERANCE VARIATION DATA OF SPEAKER p

| STANDARD FORM | | VARIATION FORM | NUMBER OF APPEARANCES |
|---|---|---|---|
| t-o+# | → | o-o+# | : 123 |
| k-u+# | → | k-u+u | : 110 |
| t-o+# | → | t-o+o | : 86 |
| t-e+e | → | t-e+i | : 81 |
| a-Qt+t | → | a-t+e | : 79 |
| t-o+k | → | o-o+k | : 74 |
| r-u+k | → | r-o+k | : 67 |
| w-a+# | → | a-a+# | : 62 |
| #-N+N | → | #-u+N | : 62 |
| ... | | | |

FIG.4 tfidf VALUE OF UTTERANCE VARIATION OF SPEAKER p

| STANDARD FORM | | VARIATION FORM | tfidf VALUE |
|---|---|---|---|
| a-e+k | → | g-a+k | : 2.28 |
| #-u+N | → | #-N+t | : 2.27 |
| d-e+i | → | e-N+i | : 2.11 |
| u-i+t | → | u-e+t | : 2.05 |
| #-d+a | → | #-a+k | : 1.97 |
| my-i+i | → | my-i+e | : 1.95 |
| a-N+n | → | n-a+n | : 1.88 |
| e-i+zy | → | i-i+zy | : 1.78 |
| e-a+g | → | a-a+g | : 1.74 |
| ... | | | |

FIG.5

RECOGNITION DICTIONARY EXTENSION RULE (1) LACK OF CONSONANT
A/N−X+B → *−A/N+B, A/N−B+*
−X+A → #−A+*

(2) INSERTION OF CONSONANT
*−A/N+B, A/N−B+* → A/N−X+B
−A+* → #−X+A (3) REPLACEMENT OF CONSONANT
A/N−X+B/N → A/N−Y+B/N
−X+A/N → #−Y+A/N (4) LACK OF VOWEL
A/N−B+% → *−A/N+%, A/N−%+*
X−A+B/N → *−X+B/N, X−B/N+*
−A+% → #−%+*
A−B+# → *−A+#

(5) INSERTION OF VOWEL
*−A/N/X+%, A/N/X−%+* → A/N/X−B+%
−%+* → #−A+%
*−A/N+# → A/N−B+#

(6) REPLACEMENT OF VOWEL
A/X/N−B+% → A/X/N−C+%
−A+% → #−B+%
%−A+# → %−B+#

(7) LACK OF SOKUON (DOUBLE CONSONANT)
A/N−Qx+X → *−A/N+X, A/N−X+*
−Qx+X → #−X+*

(8) INSERTION OF SOKUON
*−A/N+X, A/N−X+* → A/N−Qx+X
−X+* → #−Qx+X (9) LACK OF HATSUON (SYLLABIC N)
A/N−N+% → *−A/N+%, A/N−%+*
−N+% → #−%+*
A/N−N+# → *−A/N+#

(10) INSERTION OF HATSUON
*−A/N+%, A/N−%+* → A/N−N+%
*−X+A, X−A+* → X−N+A
−%+* → #−N+%
*−A/N+# → A/N−N+#

A,B:VOWEL
N:HATSUON (SYLLABIC N)
:SILENCE
X:CONSONANT
Qx:SOKUON (DOUBLE CONSONANT)

*:ANY SYLLABIC SOUND INCLUDING SILENCE
%:ANY SYLLABIC SOUND OTHER THAN SILENCE

FIG.6

UTTERANCE VARIATION DICTIONARY
OF STANDARD FORM "onsee"

| UTTERANCE VARIATION \ UTTERANCE VARIATION SET | UTTERANCE VARIATION SET 1 | UTTERANCE VARIATION SET 2 | UTTERANCE VARIATION SET 3 |
|---|---|---|---|
| \<onsen\> | ○ | ○ | ○ |
| \<onse\> | ○ | ○ | ○ |
| \<onsenne\> | ○ | × | × |
| \<onsuee\> | ○ | × | ○ |
| \<onseee\> | ○ | ○ | × |

EXTENDED RECOGNITION DICTIONARY LEARNING DEVICE AND SPEECH RECOGNITION SYSTEM

TECHNICAL FIELD

The present invention relates to an extended recognition dictionary learning device and a speech recognition system and, more particularly, to an extended recognition dictionary learning device capable of extending a recognition dictionary with respect to speech including utterance variations to improve the performance of the device and a speech recognition system utilizing the extended recognition dictionary learning device.

BACKGROUND ART

Examples of a speech recognition system relating to the present invention is disclosed in Patent Document 1 and Non-Patent Document 1.

Figure 7:
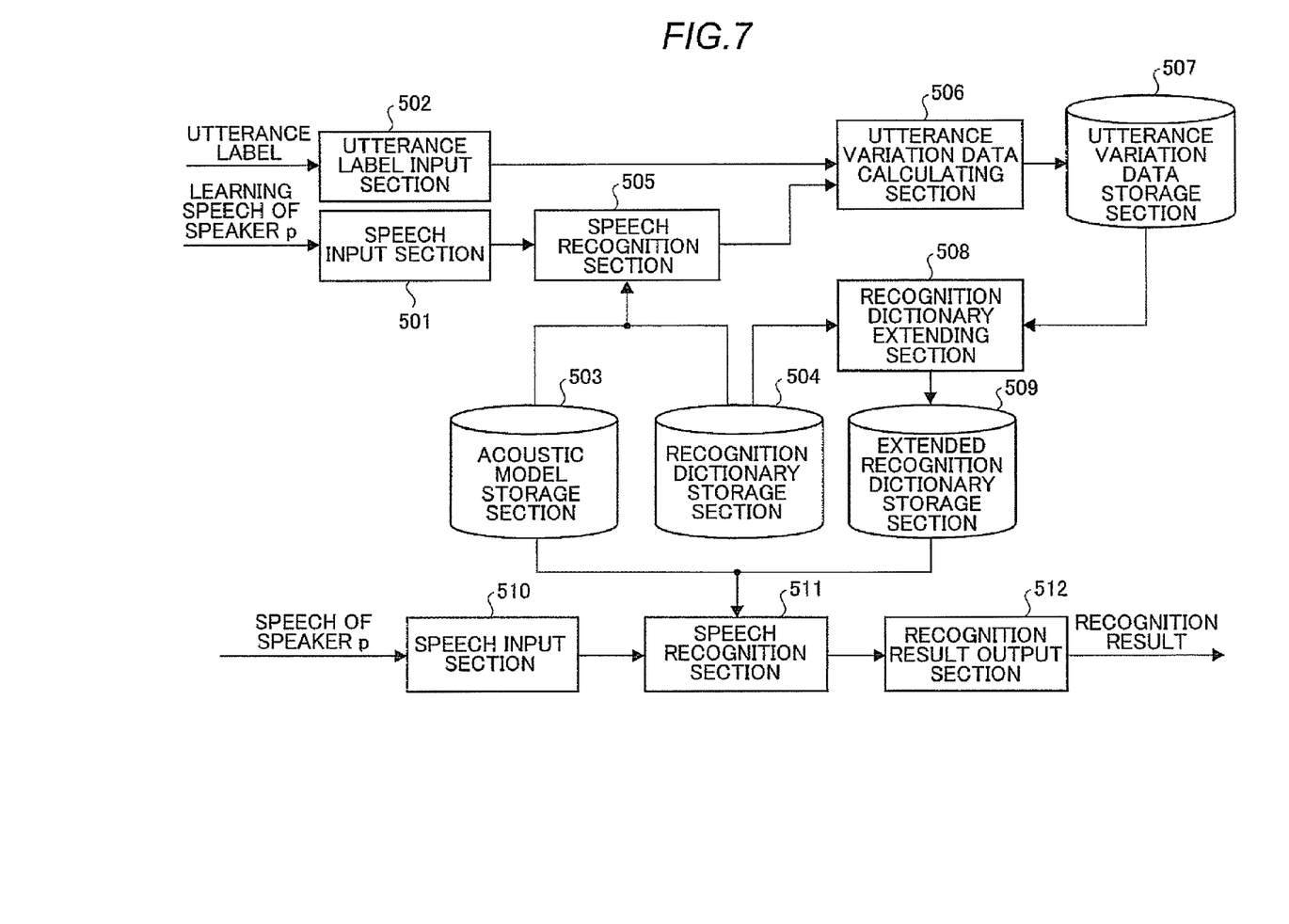
FIG. 7 is a view showing a configuration of a speech recognition device according to a conventional art.

As shown in FIG. 7, the speech recognition system according to the prior art includes a speech input section 501, an utterance label input section 502, an acoustic model storage section 503, a recognition dictionary storage section 504, a speech recognition section 505, an utterance variation data calculating section 506, an utterance variation data storage section 507, a recognition dictionary extending section 508, an extended recognition dictionary storage section 509, a speech input section 510, a speech recognition section 511, and a recognition result output section 512.

The speech recognition system having the above configuration operates as follows.

First, a learning step of an extended recognition dictionary of a speaker p will be described. Learning speech of the speaker p is input through the speech input section 501 and is then recognized by the speech recognition section 505 using an acoustic model stored in the acoustic model storage section 503 and a recognition dictionary stored in the recognition dictionary storage section 504. Then, in the utterance variation data calculating section 506, a recognition result phoneme sequence output from the speech recognition section 505 and an utterance label including a correct phoneme sequence corresponding to the learning speech of the speaker p which is input through the utterance label input section 502 are compared with each other to calculate a correspondence between the correct phoneme sequence and recognition result phoneme sequence. The calculated correspondence is stored in the utterance variation data storage section 507. Further, in the recognition dictionary extending section 508, standard phoneme sequences of words included in the recognition dictionary stored in the recognition dictionary storage section 504 are replaced with the utterance variation phoneme sequences stored in the utterance variation data storage section 507 to generate an extended recognition dictionary including a plurality of phoneme sequences. The generated extended recognition dictionary is stored in the extended recognition dictionary storage section 509.

Next, a recognition step of speech of the speaker p will be described. The speech of the speaker p input through the speech input section 501 is recognized by the speech recognition section 511 using the acoustic model stored in the acoustic model storage section 503 and the extended recognition dictionary that has learned the utterance variation of the speaker p which is stored in the extended recognition dictionary storage section 509. A recognition result of the speech recognition section 511 is output from the recognition result output section 512.

Patent Document 1: JP-A-08-123470
Non-Patent Document 1: "Phoneme Candidate Re-entry Modeling Using Recognition Error Characteristics over Multiple HMM States" written by Wakita and two others, transactions of the Institute of Electronics, Information and Communication Engineers D-II, Vol. J79-D-II, No. 12, p. 2086-2095, December 1996
Non-Patent Document 2: "Pattern Recognition and Learning from the perspective of statistical science: Section I—Pattern Recognition and Learning" written by HidekiAsoh, Iwanami-Shoten, 2003, p. 58-61
Non-Patent Document 3: "Information Processing of Characters and Sounds", written by Nagao and five others, Iwanami-Shoten, January 2001, p. 34-35
Non-Patent Document 4: "A Post-Processing System to Yield Reduced Word Error Rates: Recognizer Output Voting Error Reduction (ROVER)" written by Jonathan G. Fiscus, Proc. IEEE ASRU Workshop, p. 437-352, 1997

DISCLOSURE OF THE INVENTION

Technical Problem

The above conventional art has a problem that the recognition made using the extended recognition dictionary cannot be applied to a speaker who uses the speech recognition system for the first time. This is because that it is necessary for the system to previously learn the extended recognition dictionary of the speaker and, at that time, an utterance label corresponding to the speech of the speaker is used.

An object of the present invention is to enable speech recognition of even a speaker who uses a speech recognition system for the first time by using an extended recognition dictionary suited to the speaker without requiring any previous learning using an utterance label corresponding to the speech of the speaker.

Solution to Problem

To attain the above object, according to an aspect of the present invention, there is provided an extended recognition dictionary learning device including: an utterance variation data calculating section for comparing an acoustic model sequence output from a speech recognition result and an input correct acoustic model sequence to calculate a correspondence between the models as utterance variation data; an utterance variation data classifying section for classifying the calculated utterance variation data into widely appearing utterance variations and unevenly appearing utterance variations; and a recognition dictionary extending section for defining a plurality of utterance variation sets by combining the classified utterance variations and thereby extending the recognition dictionary for each utterance variation set according to the utterance variations included in each utterance variation set.

Further, according to another aspect of the present invention, there is provided a speech recognition system that utilizes the above extended recognition dictionary learning device.

Advantages Effects of Invention

According to the present invention, it is possible to enable speech recognition of even a speaker who uses a speech recognition system for the first time by using an extended recognition dictionary suited to the speaker without requiring any previous learning using an utterance label corresponding to the speech of the speaker.

EXPLANATION OF REFERENCE

100: Extended recognition dictionary learning device
110: Speech input section
111: Utterance label input section
112: Acoustic model storage section
113: Recognition dictionary storage section
114: Speech recognition section
115: Utterance variation data calculating section
116: Utterance variation data storage section
117: Utterance variation data classifying section
118: Recognition dictionary extending section
119: Extended recognition dictionary storage section
120: Speech recognition device
121: Speech input section
122: Speech recognition section
123: Recognition result output section
131: idf value/tfidf value calculating section
132: Utterance variation vector
133: Utterance variation vector clustering section
141: idf utterance variation vector
142: Utterance variation vector of clusters
151: Utterance variation vector integrating section
152: Utterance variation sets
153: Recognition dictionary extending section
154: Recognition dictionary extension rule
501: Speech input section
502: Utterance label input section
503: Acoustic model storage section
504: Recognition dictionary storage section
505: Speech recognition section
506: Utterance variation data calculating section
507: Utterance variation data storage section
508: Recognition dictionary extending section
509: Extended recognition dictionary storage section
510: Speech input section
511: Speech recognition section
512: Recognition result output section

DESCRIPTION OF EMBODIMENTS

An exemplary embodiment of the present invention will be described in detail below with reference to the accompanying drawings.

An extended recognition dictionary learning system according to an exemplary embodiment of the present invention includes a speech input section, an utterance label input section, an acoustic model storage section, a recognition dictionary storage section, a speech recognition section, an utterance variation data calculating section, an utterance variation data storage section, an utterance variation data classifying section, a recognition dictionary extending section, and an extended recognition dictionary storage section.

The speech recognition section uses an acoustic model stored in the acoustic model storage section and recognition dictionary stored in the recognition dictionary storage section to speech-recognizes learning speech input through the speech input section.

The utterance variation data calculating section compares an utterance label including a correct phoneme sequence corresponding to the learning speech which is input through the utterance label input section and a phoneme sequence which is obtained as a result of speech recognition made by the speech recognition section to calculate a correspondence between the correct phoneme sequence and recognition result phoneme sequence as utterance variation data and stores the calculated utterance variation data in the utterance variation data storage section.

The utterance variation data classifying section classifies the stored utterance variation data into utterance variations widely appearing in the learning speech and utterance variations unevenly appearing in the learning speech.

The recognition dictionary extending section defines utterance variation sets by combining the classified utterance variations and replaces standard phoneme sequences of words included in the recognition dictionary stored in the speech recognition system with the utterance variation phoneme sequences to generate an extended recognition dictionary including a plurality of phoneme sequences for each utterance variation set.

With the above configuration, an extended recognition dictionary generated for each utterance variation set generated by combining the utterance variations widely appearing in the learning speech and utterance variations unevenly appearing with respect to the learning speech can previously be learned.

Further, for a speaker who uses the system for the first time, the acoustic model stored in the system and learned extended recognition dictionary generated for each utterance variation set are used to select a recognition dictionary suited to the speaker for recognition. With this configuration, it is possible to obtain a recognition result by using the extended recognition dictionary without requiring any previous learning of a new speaker.

According to the present exemplary embodiment, the following effects can be obtained.

A first effect is that a plurality of extended recognition dictionaries can be learned for each utterance variation set. This is because that the utterance variation data is classified into utterance variations widely appearing in the learning speech including a variety of utterances and utterance variation unevenly appearing in the learning speech, the classified utterance variations are combined to define utterance variation sets, and an extended recognition dictionary is learned for each utterance variation set.

A second effect is that it is possible to obtain a recognition result by using the extended recognition dictionary without requiring any previous learning of a speaker who uses the system for the first time. This is because that the extended recognition dictionary generated for each utterance variation set that has been learned by using the abovementioned extended recognition dictionary learning system is used to select an extended recognition dictionary suited to the speech of the new speaker for recognition.

Example

Figure 1:
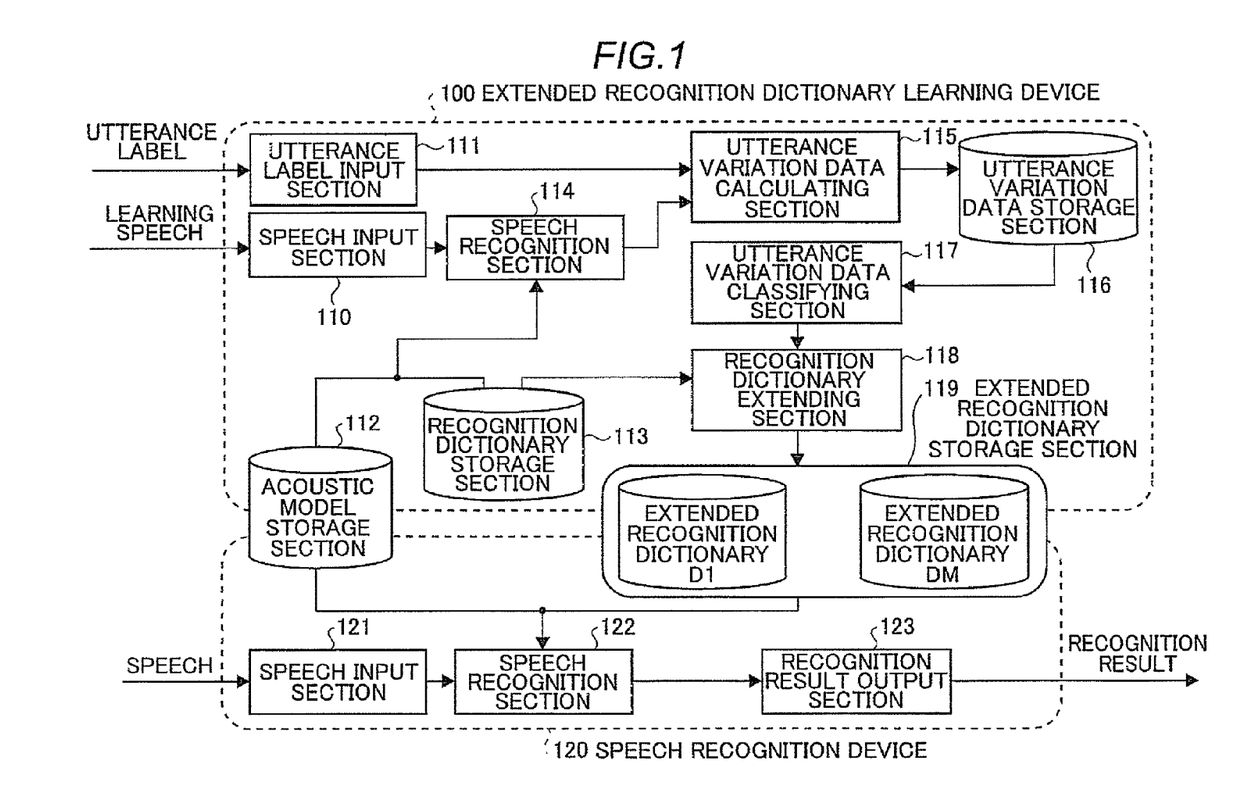
FIG. 1 is a block diagram showing a configuration of a speech recognition system using an extended recognition dictionary learning device according to an example of the present invention.

FIG. 1 is a block diagram showing a configuration of a speech recognition system using an extended recognition dictionary learning device according to an example of the present invention.

The speech recognition system shown in FIG. 1 includes an extended recognition dictionary learning device 100 that learns a plurality of extended recognition dictionaries for each utterance variation set obtained by combining utterance variations widely appearing in learning speech and utterance variation unevenly appearing in the learning speech, and a speech recognition device 120 that recognizes the speech of a speaker using the plurality of extended recognition dictionaries learned for each utterance variation set by the extended recognition dictionary learning device 100.

The extended recognition dictionary learning device 100 is, e.g., an electronic computer such as a personal computer and includes a speech input section 110, an utterance label input section 111, an acoustic model storage section 112, a recognition dictionary storage section 113, a speech recognition section 114, an utterance variation data calculating section 115, an utterance variation data storage section 116, an utterance variation data classifying section 117, a recognition dictionary extending section 118, and an extended recognition dictionary storage section 119.

The speech input section 110 is a program that receives speech data from e.g., a computer (computer in which the speech input section 110 is provided or another computer) to which learning speech is input directly or via a network.

The utterance label input section 111 is a program that receives utterance label data from e.g., a computer (computer in which the speech input section 110 is provided or another computer) to which an utterance label corresponding to the learning speech is input directly or via a network.

The acoustic model storage section 112 is, e.g., a hard disk drive or a memory and stores an acoustic model used for speech recognition.

The recognition dictionary storage section 113 is, e.g., a hard disk drive or a memory and a recognition dictionary used for speech recognition.

The speech recognition section 114 is a program allowing, e.g., a computer to perform speech recognition for the input learning speech using the acoustic model stored in the acoustic model storage section 112 and recognition dictionary stored in the recognition dictionary storage section 113 and output a result of the recognition.

The utterance variation data calculating section 115 is a program allowing, e.g., a computer to compare the recognition result output from the speech recognition section 114 and utterance label corresponding to the input learning speech to calculate the correspondence between them and store the calculated correspondence in the utterance variation data storage section 116.

The utterance variation data storage section 116 is, e.g., a hard disk drive or a memory and stores the utterance variation data calculated by the utterance variation data calculating section 115.

Here, with attention focused on speaker individuality, a case where the utterance variation data is calculated by three sets of an environment-dependent phoneme, i.e., trip hone, which is a unit of an acoustic model commonly used in recent speech recognition systems will be described.

Figure 3:
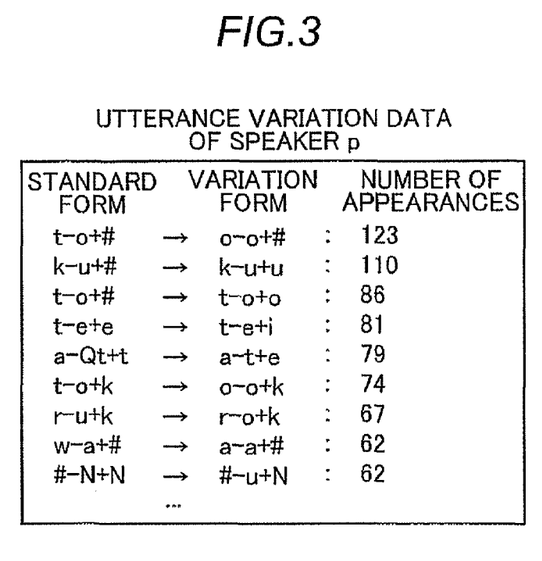
FIG. 3 is a view showing an example of utterance variation data in the present example.

Utterances of N speakers are used as the learning speech to be input. The speech recognition section 114 outputs a trip hone sequence for each frame of the input learning speech. A correct triphone sequence corresponding to the learning speech is input as the utterance label. The utterance variation data calculating section 115 compares the correct triphone sequences and recognition result triphone sequences for each frame of the learning speech to thereby calculate a correspondence between them, counts the number of frames appearing as patterns of a standard form and patterns of a variation form respectively and stores, for each speaker, the counting result as the utterance variation data in the utterance variation data storage section 116. FIG. 3 shows the utterance variation data of a speaker p. In FIG. 3, the utterance variation data of the speaker p is constituted by patterns of a standard form, patterns of an utterance variation form corresponding to the patterns of the standard form, and the number of appearances of the patterns of the utterance variation form.

Although attention is focused on speaker individuality here, another point of view may be taken on account. For example, N groups of utterance speed, age of speakers, speech-to-noise ratio, or combination thereof may be input in place of N speakers.

Further, the triphone may be replaced with phoneme depending on larger number of environments, non-environment-dependent phoneme, or unit such as syllable, word, or state sequence in which the acoustic model is expressed by a Hidden Markov Model.

The utterance variation data classifying section 117 is a program allowing, e.g., a computer to classify the utterance variation data stored in the utterance variation data storage section 116 into utterance variations widely appearing in the learning speech and utterance variations unevenly appearing in the learning speech.

The recognition dictionary extending section 118 is a program allowing, e.g., a computer to replace the recognition dictionary stored in the recognition dictionary storage section 113 with the utterance variation for each utterance variation set obtained by combining the utterance variations classified by the utterance variation data classifying section 117 to generate an extended recognition dictionary including a plurality of phoneme sequences for each utterance variation set and store the generated extended recognition dictionary in the extended recognition dictionary storage section 119.

Figure 2:
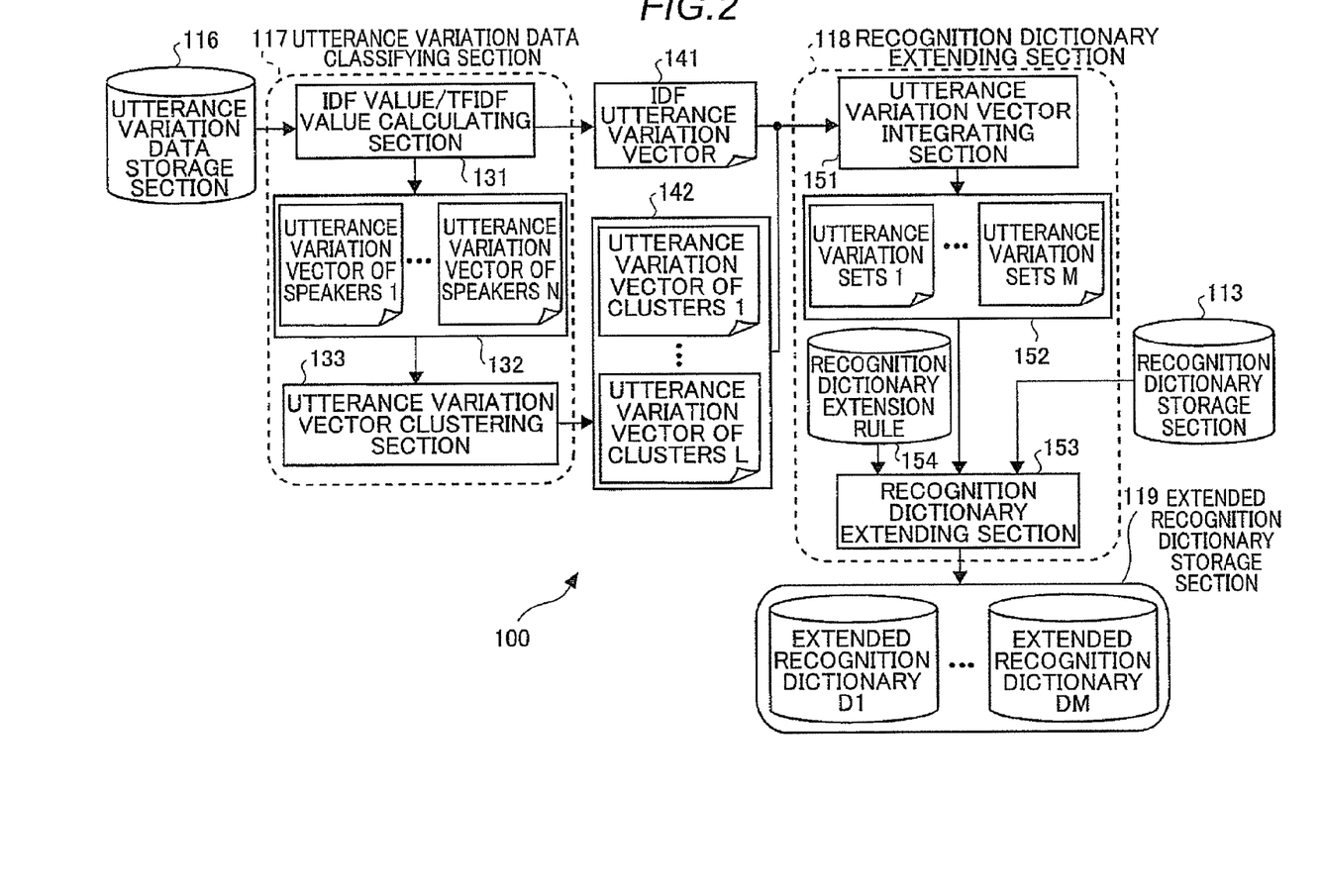
FIG. 2 is a view showing configurations of an utterance variation data classifying section and a recognition dictionary extending section in the present example.

FIG. 2 is a view for explaining detailed configurations of the utterance variation data classifying section 117 and recognition dictionary extending section 118.

The utterance variation data classifying section 117 classifies the utterance variations as follows.

The utterance variation data classifying section 117 uses an idf value/tfidf value calculating section 131 to perform, on a per speaker basis, calculation of an idf (inverse document frequency) value and tfidf value (to be described later) of the utterance variation for the utterance variation data stored in the utterance variation data storage section 116.

idx(X) corresponding to the idf value of the utterance variation is represented by the following equation (numeral 4).

$$idf(X) = \log\frac{N}{dnum(X)} + 1 \qquad \text{[Numeral 4]}$$

In Numeral 4, X is the utterance variation, N is the number of speakers, and dnum(X) is the number of appearances of an utterance variation X in the utterance variation data of each of the N speakers. The smaller idf value section that the corresponding utterance variation is found in many speakers.

The idf value/tfidf value calculating section 131 sets the utterance variation appearing in the utterance variation data storage section 116 as the dimension of each vector and calculates an idf utterance variation vector 141 with the idf value set as value of the dimension.

tfidf(X,p) corresponding to the tfidf value of the utterance variation is a value obtained by multiplying tf(X,p) corresponding to tf (term frequency) value represented by the following equation (Numeral 5) and idf(X) corresponding to the idf value, which is represented by the following equation (Numeral 6).

$$tf(X, p) = \frac{\log(tnum(X, p)) + 1}{\log(frame(p))}$$ [Numeral 5]

$$tfidf(X, p) = tf(X, p)idf(X)$$ [Numeral 6]

In Numeral 6, tnum(X,p) is the number of counts of a frame in which an utterance variation X has appeared in the utterance variation data of the speaker p, and frame (p) is the number of frames of the learning speech of the speaker p. The larger the tf value, the larger the frequency of appearances of the corresponding utterance variation in the utterance variation data of the speaker p. Further, the larger the idf value is, the smaller the frequency of appearances of the relevant utterance variation in speakers other than the speaker p. This section that the larger the tfidf value, the larger the unevenness of appearance of the utterance variation X.

In this manner, the utterance variation data classifying section 117 uses the idf value/tfidf value calculating section 131 to calculate the tfidf values of the utterance variations for each speaker (utterance variation vector 132).

Figure 4:
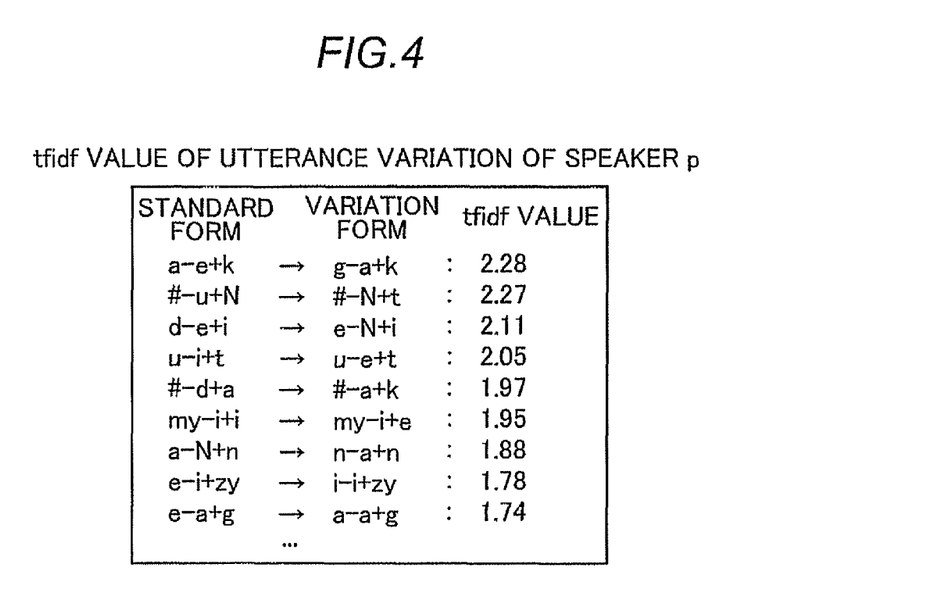
FIG. 4 is a view showing an example of a tfidf value of the utterance variation in the present example.

FIG. 4 shows an example of the tfidf value of the utterance variation of the speaker p. In FIG. 4, the utterance variation data of the speaker p is constituted by patterns of a standard form, patterns of an utterance variation form corresponding to patterns of the standard form, and the tfidf values of patterns of the utterance variation form.

The utterance variation data classifying section 117 uses an utterance variation vector clustering section 133 to perform clustering of the utterance variation vector 132. For example, using the utterance variations of each speaker and tfidf values thereof, dist(p1, p2) representing the similarity is defined by the following equation (Numeral 7).

$$dist(p1, p2) = 1 - \frac{y1 \cdot y2}{|y1||y2|}$$ [Numeral 7]

In Numeral 7, y1 is the vector of the utterance variation of the speaker p1. The dimension of each vector is the number of all utterance variations that may exist, and the value thereof is the tfidf value. The value of the dimension of the utterance variation that has not appeared in the learning speech is 0. y2 is defined in the same manner for a speaker p2.

Based on the defined similarity, processing of sequentially integrating the clusters whose inter-cluster distance, which is defined as the greatest distance between the members of the relevant clusters, is smaller is hierarchically repeated from bottom up. This processing is repeated until the number of cluster groups becomes L, whereby the clustering of the utterance variation vector 132 is executed. The details of this processing are described in Non-Patent Document 2.

The utterance variation vector clustering section 133 calculates an utterance variation vector 142 for each of the L cluster groups with the center of the utterance variation vector of each cluster group set as the utterance variation vector of the cluster group. Other clustering methods than above, such as k-section clustering (refer to Non-Patent Document 2), may be adopted.

With the abovementioned procedure, the utterance variations whose idf values are smaller than a predetermined reference value (threshold) are extracted in the idf utterance variation vector 141, whereby it is possible to obtain utterance variations (utterance variations widely appearing over a plurality of speakers) commonly appearing in the learning speech of many speakers. Further, the utterance variations whose tfidf values are greater than a predetermined reference value (threshold) are extracted from respective clusters in the cluster utterance variation vector 142, whereby it is possible to obtain L-classified utterance variations (utterance variations unevenly appearing in specified speakers) unevenly appearing in the learning speech.

The tfidf value is used for measurement of the similarity between documents which is made based on use frequency of words in the documents. The details of the tfidf value are described in, e.g., Non-Patent Document 3.

The recognition dictionary extending section 118 replaces standard phoneme sequences of words included in the recognition dictionary stored in the recognition dictionary storage section 113 with utterance variation phoneme sequences for each utterance variation set obtained by combining the utterance variations widely appearing in learning speech and utterance variation unevenly appearing in the learning speech which has been classified by the utterance variation data classifying section 117 to thereby generate an extended recognition dictionary including a plurality of phoneme sequences.

The recognition dictionary extending section 118 generates the extended recognition dictionary as follows.

The recognition dictionary extending section 118 uses the idf utterance variation vector 141 and utterance variation vectors 142 of clusters 1 to L which have been calculated by the utterance variation data classifying section 117 to allow an utterance variation vector integrating section 151 to combine respective utterance variations to generate an utterance variation vector 152 for each of M utterance variation sets.

At this time, when an utterance variation set including j utterance variations having smaller values in the idf utterance variation vector is generated, the obtained utterance variation set serves as a common utterance variation set that widely appears in the learning speech regardless of the speaker individuality.

Alternatively, by combining q utterance variations having smaller values in the idf utterance variation vector and r utterance variations of each cluster, L utterance variation sets each having q+r utterance variations can be generated. In this manner, M utterance variation sets are calculated (utterance variation vector 152).

For example, a common utterance variation set and L utterance variation sets are used together, that is, M(=L+1) utterance variation sets are used.

The recognition dictionary extending section 153 replaces standard phoneme sequences of words included in the recognition dictionary stored in the recognition dictionary storage section 113 with utterance variations included in M utterance variation sets to thereby generate M extended recognition dictionaries.

In the case where the utterance variation data of the learning speech is calculated in the form of a triphone pair, each utterance variation is described in the form of a triphone pair. In this case, the environment-dependent phoneme is used, so that utterance variations in which phoneme sequences after transformation cannot be established as Japanese may be included in the triphone pairs by simple replacement. Thus, a restriction is given using a recognition dictionary extension rule stored in a recognition dictionary extension rule 154 so that utterance variations in which phoneme sequences after replacement can be established as Japanese.

Figure 5:
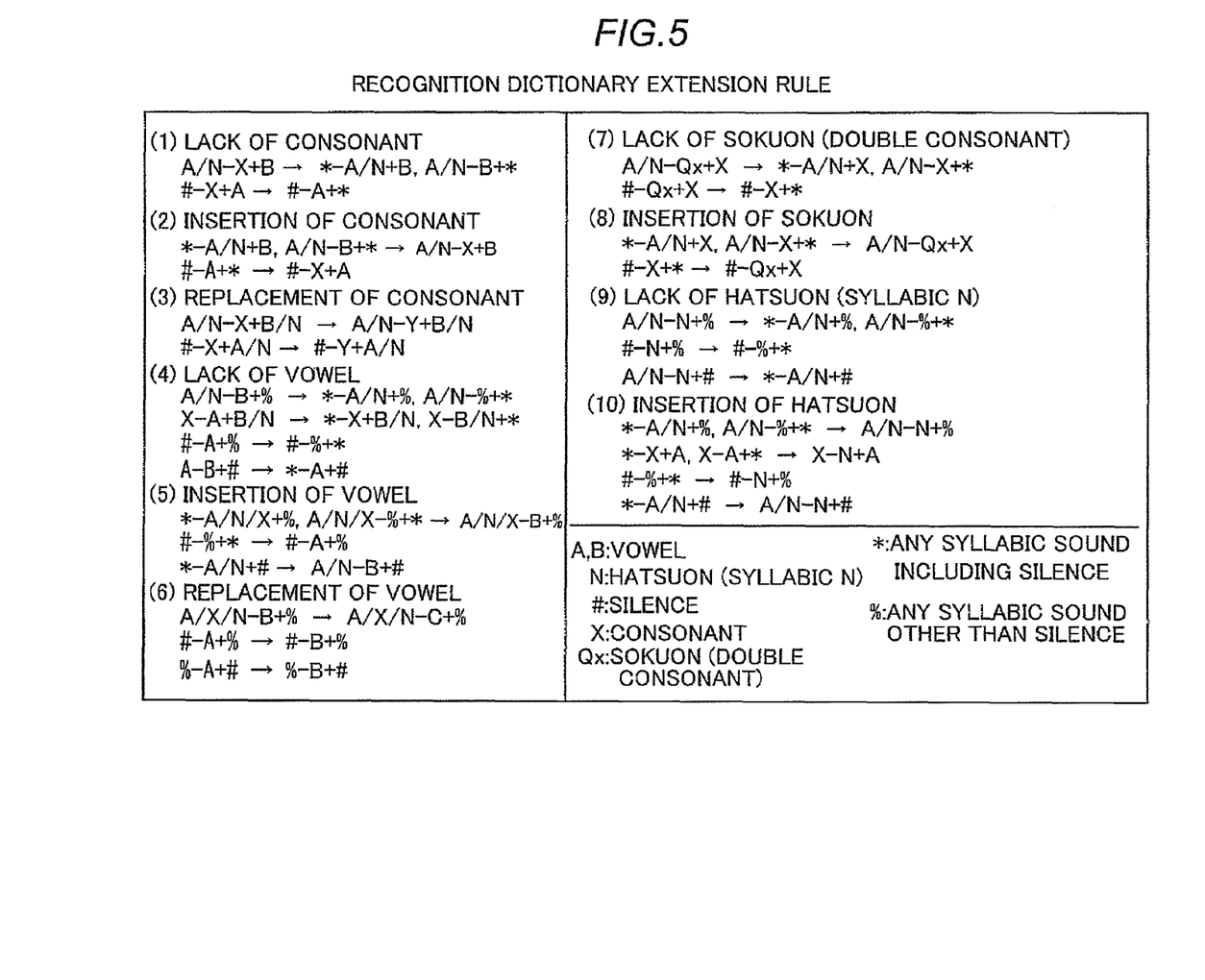
FIG. 5 is a view showing an example of a recognition dictionary extension rule in the present example.

An example of the recognition dictionary extension rule 154 is shown in FIG. 5. In FIG. 5, ten rules, that is, (1) lack of consonant; (2) insertion of consonant; (3) replacement of consonant; (4) lack of vowel; (5) insertion of vowel; (6) replacement of vowel; (7) lack of "sokuon" (double consonant); (8) insertion of "sokuon"; (9) lack of "hatsuon" (syllabic n); and (10) insertion of "hatsuon" are exemplified.

Here, a variation of "onsee" (Japanese meaning "speech") which is a word included in the recognition dictionary is considered. It is assumed that "oNsee" is registered as a standard form of "onsee". In this case, if "s−e+e→s−u+e" exists as the utterance variation, which corresponds to (5) insertion of vowel in the rule shown in FIG. 5, "onsee: <oNsuee>" is added to the extended recognition dictionary. On the other hand, if "s−e+e→sy−u+u" exists as the utterance variation, it is not possible to perform replacement consistent with ambient phonemes, that is, this case does not apply to any item in the rule of FIG. 5. Thus, addition to the extended recognition dictionary is not made.

Figure 6:
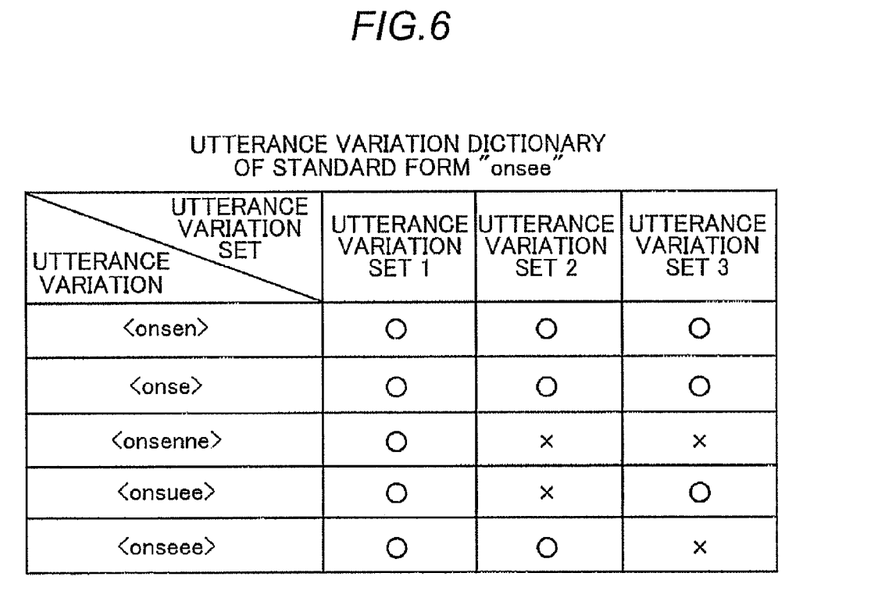
FIG. 6 is a view showing an example of an utterance variation in the extended recognition dictionary including utterance variation sets in the present example.

An example of an extended utterance variation dictionary obtained by the present example is shown in FIG. 6. In FIG. 6, utterance variation dictionaries of three utterance variation sets 1 to 3 are created for the standard form "onsee", and O is given when a target utterance variation is included in each dictionary while × is given when a target utterance variation is not included. In the example of FIG. 6, the utterance variations <onsen> and <onse> appear in common in the three utterance variation sets 1 to 3, whereas utterance variations <onsenne>, <onsuee>, and <onseee> unevenly appear in one or two of the three utterance variation sets 1 to 3.

With the above procedure, it is possible to learn the extended recognition dictionary including utterance variations for each utterance variation set.

By applying the restriction of the utterance variation using the recognition dictionary extension rule to the utterance variation calculating section, it is possible to reduce the amount of data to be stored in the utterance variation data storage section and, further, it is possible to prevent degradation of clustering accuracy due to sparseness of utterance variation vector space which is caused in the utterance variation data classifying section due to wide range of utterance variation.

According to the example in which the extended recognition dictionary is created using the M(=L+1) utterance variation sets in the above procedure, q utterance variations that widely appear in the learning speech data are included in all the extended recognition dictionaries, thereby coping with utterance variations appearing in a speaker who uses the system for the first time.

Further, when the number of utterance variations in the extended recognition dictionary becomes excessively increased, the number of words having the same or similar sound is correspondingly increased to deteriorate recognition accuracy. In the present example, however, the utterance variations unevenly appearing in the learning data are sorted into L extended recognition dictionaries, thereby preventing the number of utterance variations included in one extended recognition dictionaries from being increased excessively.

Further, by creating an extended recognition dictionary using one utterance variation set including j(q<j) utterance variations widely appearing in the learning data, a reduction of influence of a difference between the utterance variations of the new speaker and unevenness of the learning utterance variations can be expected, even if the difference is large.

The speech recognition device 120 is, e.g., an electronic computer such as a personal computer and includes a speech input section 121, an acoustic model storage section 112, an extended recognition dictionary storage section 119, a speech recognition section 122, and a recognition result output section 123.

The speech recognition section 122 recognizes speech input through the speech input section 121 using the acoustic model stored in the acoustic model storage section 112 and the extended recognition dictionaries stored in the extended recognition dictionary storage section 119 that have been learned by the extended recognition dictionary learning device 100 and selects an adequate recognition dictionary so as to output a recognition result from the recognition result output section 123.

An example of the recognition dictionary selection procedure performed by the speech recognition section 122 will be described below.

The speech recognition section 122 uses the recognition dictionaries stored in the extended recognition dictionary storage section 119 to output a plurality of recognition result candidates and selects a final recognition result from the recognition result candidates based on a majority decision method such as R over method. The details of the R over method are described in Non-Patent Document 4.

Alternatively, the speech recognition section 122 uses the recognition dictionaries stored in the extended recognition dictionary storage section 119 to output a plurality of recognition result candidates and scores or reliabilities thereof and selects/outputs a recognition result having the highest score or reliability as a final recognition result.

Alternatively, the speech recognition section 122 uses speech of the speakers classified by the utterance variation data classifying section 117 to learn M mixture gaussian distributions, calculates scores of the M mixture gaussian distributions corresponding to the speech to be recognized, and performs speech recognition using an extended recognition dictionary corresponding to a classification having the highest score so as to output the recognition result.

With the above procedure, even if a speech of a speaker who uses the system for the first time is input, it is possible to select an extended recognition dictionary suited to the new speaker from a plurality of the learned extended recognition dictionaries and to use the recognition dictionary including the utterance variations, to thereby obtain a recognition result.

Although the present invention has been described in detail with reference to the above example, it should be understood that the present invention is not limited to the above representative examples. Thus, various modifications and changes may be made by those skilled in the art without departing from the true scope of the invention as defined by the appended claims. Accordingly, all of the modifications and the changes thereof are included in the scope of the present invention.

When at least a part of a function of each section constituting the speech recognition system using the extended recognition dictionary learning device according to the example of the present invention is realized using a program code, the program code and a recording medium for recording the program code are included in the category of the present invention. In this case, when the above functions are realized by cooperation between the program code and operating system or other application programs, the present invention includes the program code thereof.

Other exemplary embodiments of the present invention will be described below.

In a second exemplary embodiment of the present invention, the utterance variation data classifying section includes a first calculating section for using the idf value of the utterance variation data to calculate utterance variations widely appearing in the utterance variation data as the idf utterance variation vector, and a second calculating section for using the tfidf value calculated using the tf value of the utterance variation data and idf value to cluster the utterance variations unevenly appearing in the utterance variation data to calculate a cluster utterance variation vector. The recognition dictionary extending section may construct a plurality of utterance variation sets by using only utterance variations having a value of the idf utterance variation vector smaller than a predetermined value or by combining the utterance variations having a value of the idf utterance variation vector smaller than a predetermined value and utterance variations having a value of the cluster utterance variation vector larger than a predetermined value.

In a third exemplary embodiment of the present invention, the recognition dictionary extending section may construct the same number of utterance variation sets as the number of clusters by including in each utterance variation set both the utterance variations having a value of the idf utterance variation vector smaller than a predetermined value and utterance variation shaving a value of the cluster utterance variation vector larger than a predetermined value.

In a fourth exemplary embodiment of the present invention, the recognition dictionary extending section may construct the number of utterance variation sets larger by one than the number of clusters by further constructing an utterance variation set including the utterance variations having a value of the idf utterance variation vector smaller than a predetermined value in addition to the same number of utterance variation sets as the number of clusters.

In a fifth exemplary embodiment of the present invention, the recognition dictionary extending section may extend the recognition dictionary to construct an extended recognition dictionary for each utterance variation set by adding, to the recognition dictionary, items in which standard utterances included in the recognition dictionary are replaced with utterance variations included in each of the utterance variation sets under a rule that has previously been set as a recognition dictionary extension rule so as to allow utterance variations to be established as speech of a language to be recognized.

In a sixth exemplary embodiment of the present invention, the first calculating section may calculate utterance variations widely appearing in the utterance variation data as the idf utterance variation vector by using the idf value of the utterance variation data represented by idf(X) calculated by the following equations:

$$idf(X) = \log \frac{N}{dnum(X)} + 1 \qquad \text{[Numeral 8]}$$

where the utterance variation is X, the number of speakers is N, and the number of appearances of the utterance variation X in the utterance variation data of each of the N speakers is dnum(X). The second calculating section may cluster the utterance variations unevenly appearing in the utterance variation data to calculate a cluster utterance variation vector using a tfidf value of the utterance variation data represented by tfidf(X,p) that is calculated using tf(X,p) calculated by the following equation:

$$tf(X, p) = \frac{\log(tnum(X, p)) + 1}{\log(\text{frame}(p))} \qquad \text{[Numeral 9]}$$

where the number of counts of a frame in which an utterance variation X has appeared in the utterance variation data of the speaker p is tnum(X,p), and the number of frames of the learning speech of the speaker p is frame(p) and the idf(X) according to the following equation:

$$tfidf(X,p)=tf(X,p)idf(X) \qquad \text{[Numeral 10]}$$

A speech recognition device according to an exemplary embodiment of the present invention is characterized by including a speech recognition section for performing speech recognition for input speech using the recognition dictionary generated for each utterance variation set that has been learned by the extended recognition dictionary learning device recited in the above exemplary embodiments. The speech recognition section may select as hypothesis a final recognition result from recognition results obtained for each extended recognition dictionary based on a majority decision method so as to output the final recognition result.

An extended recognition dictionary learning method according to an exemplary embodiment of the present invention is characterized by including a step of comparing an acoustic model sequence output from a speech recognition result and an input correct acoustic model sequence to calculate a correspondence between the models, a step of classifying calculated utterance variation data into widely appearing utterance variations and unevenly appearing utterance variations, and a step of defining a plurality of utterance variation sets by combining the classified utterance variations and thereby extending the recognition dictionary for each utterance variation set according to the utterance variations included in each utterance variation set.

An extended recognition dictionary learning program according to an exemplary embodiment of the present invention is characterized by allowing a computer to execute a step of comparing an acoustic model sequence output from a speech recognition result and an input correct acoustic model sequence to calculate a correspondence between the models, a step of classifying calculated utterance variation data into widely appearing utterance variations and unevenly appearing utterance variations, and a step of defining a plurality of utterance variation sets by combining the classified utterance variations and thereby extending the recognition dictionary for each utterance variation set according to the utterance variations included in each utterance variation set.

This present application is based upon and claims the benefit of priority from Japanese patent application No. 2007-006977, filed on Jan. 16, 2007, the disclosure of which is incorporated herein in its entirety by reference.

INDUSTRIAL APPLICABILITY

The present invention can be applied to a speech recognition system capable of extending a recognition dictionary with respect to speech including utterance variations to improve the performance of the system and a program for implementing the speech recognition system on a computer.

The invention claimed is:

1. An extended recognition dictionary learning device comprising:
an utterance variation data calculating section configured to compare an acoustic model sequence obtained from a result of speech recognition for each of a plurality of speakers and a correct acoustic model sequence to calculate a correspondence between the models as utterance variation data;
an utterance variation data classifying section configured to classify the calculated utterance variation data into widely appearing utterance variations unevenly appearing utterance variations, the widely appearing utterance variations appearing independently of speakers in the calculated utterance variation data, and the unevenly appearing utterance variations appearing dependently of speakers in the calculated utterance variation data; and
a recognition dictionary extending section configured to define a plurality of utterance variation sets by combining the classified utterance variations and to generate a plurality of extended recognition dictionaries corresponding to the plurality of utterance variation sets by extending a recognition dictionary for each utterance variation set according to the utterance variations included in each utterance variation set, wherein
the plurality of utterance variation sets comprise: a common utterance variation set that consists of only widely appearing utterance variations; and utterance variation sets each of which is generated by combining widely appearing utterance variations and unevenly appearing utterance variations.

2. The extended recognition dictionary learning device according to claim 1, wherein
the utterance variation data classifying section includes: a first calculating section for calculating utterance variations widely appearing in the utterance variation data as an idf utterance variation vector using an idf value of the utterance variation data; and a second calculating section for clustering the utterance variations unevenly appearing in the utterance variation data using a tfidf value calculated using a tf value of the utterance variation data and the idf value to calculate a cluster utterance variation vector, and
the recognition dictionary extending section constructs a plurality of utterance variation sets by using only utterance variations having a value of the idf utterance variation vector smaller than a predetermined value or by combining the utterance variations having a value of the idf utterance variation vector smaller than a predetermined value and utterance variations having a value of the cluster utterance variation vector larger than a predetermined value.

3. The extended recognition dictionary learning device according to claim 2, wherein
the recognition dictionary extending section constructs the same number of utterance variation sets as the number of clusters by including in each utterance variation set both the utterance variations having a value of the idf utterance variation vector smaller than a predetermined value and utterance variations having a value of the cluster utterance variation vector larger than a predetermined value.

4. The extended recognition dictionary learning device according to claim 3, wherein
the recognition dictionary extending section constructs the number of utterance variation sets larger by one than the number of clusters by further constructing an utterance variation set including the utterance variations having a value of the idf utterance variation vector smaller than a predetermined value in addition to the same number of utterance variation sets as the number of clusters.

5. The extended recognition dictionary learning device according to claim 1, wherein
the recognition dictionary extending section extends the recognition dictionary to construct an extended recognition dictionary for each utterance variation set by adding, to the recognition dictionary, items in which standard utterances included in the recognition dictionary are replaced with utterance variations included in each of the utterance variation sets under a rule that has previously been set as a recognition dictionary extension rule so as to allow utterance variations to be established as speech of a language to be recognized.

6. The extended recognition dictionary learning device according to claim 2, wherein
the first calculating section calculates utterance variations widely appearing in the utterance variation data as the idf utterance variation vector by using the idf value of the utterance variation data represented by idf(X) calculated by the following equations:

$$idf(X) = \log \frac{N}{dnum(X)} + 1 \qquad \text{[Numeral 1]}$$

where the utterance variation is X, the number of speakers is N, and the number of appearances of the utterance variation X in the utterance variation data of each of the N speakers is dnum(X), and
the second calculating section clusters the utterance variations unevenly appearing in the utterance variation data to calculate a cluster utterance variation vector using the tfidf value of the utterance variation data represented by tfidf (X,p) that is calculated using tf (X,p) calculated by the following equation:

$$tf(X, p) = \frac{\log(tnum(X, p)) + 1}{\log(\text{frame}(p))} \qquad \text{[Numeral 2]}$$

where the number of counts of a frame in which an utterance variation X has appeared in the utterance variation data of the speaker p is tnum(X,p) and the number of frames of the learning speech of the speaker p is frame (p) and the idf (X) according to the following equation:

$$tfidf(X,p) = tf(X,p)idf(X) \qquad \text{[Numeral 3]}.$$

7. A speech recognition device comprising
speech recognition section for performing speech recognition for input speech using the recognition dictionary generated for each utterance variation set that has been learned by the extended recognition dictionary learning device as claimed in claim 1.

8. The speech recognition device according to claim 7, wherein
the speech recognition section selects as hypothesis a final recognition result from recognition results obtained for each extended recognition dictionary based on a majority decision method so as to output the final recognition result.

9. A speech recognition system utilizing the extended recognition dictionary learning device as claimed in claim 1.

10. An extended recognition dictionary learning method, comprising:

a step of comparing an acoustic model sequence obtained from a result of speech recognition for each of a plurality of speakers and a correct acoustic model sequence to calculate a correspondence between the models as utterance variation data;

a step of classifying the calculated utterance variation data into widely appearing utterance variations and unevenly appearing utterance variations, the widely appearing utterance variations appearing independently of speakers in the calculated utterance variation data, and the unevenly appearing utterance variations appearing dependently of speakers in the calculated utterance variation data; and a step of defining a plurality of utterance variation sets by combining the classified utterance variations and generating a plurality of extended recognition dictionaries corresponding to the plurality of utterance variation sets by extending a recognition dictionary for each utterance variation set according to the utterance variations included in each utterance variation set, wherein the plurality of utterance variation sets comprise: a common utterance variation set that consists of only widely appearing utterance variations; and utterance variation sets each of which is generated by combining widely appearing utterance variations and unevenly appearing utterance variations.

11. A non-transitory storage medium having recorded thereon an extended recognition dictionary learning program which, when executed by a computer, causes the computer to execute:

a step of comparing an acoustic model sequence obtained from a result of speech recognition for each of a plurality of speakers and a correct acoustic model sequence to calculate a correspondence between the models as utterance variation data;

a step of classifying the calculated utterance variation data into widely appearing utterance variations and unevenly appearing utterance variations, the widely appearing utterance variations appearing independently of speakers in the calculated utterance variation data, and the unevenly appearing utterance variations appearing dependently of speakers in the calculated utterance variation data; and a step of defining a plurality of utterance variation sets by combining the classified utterance variations and generating a plurality of extended recognition dictionaries corresponding to the plurality of utterance variation sets by extending a recognition dictionary for each utterance variation set according to the utterance variations included in each utterance variation set, wherein the plurality of utterance variation sets comprise: a common utterance variation set that consists of only widely appearing utterance variations; and utterance variation sets each of which is generated by combining widely appearing utterance variations and unevenly appearing utterance variations.

* * * * *